No. 707,355. Patented Aug. 19, 1902.
J. J. RIDGWAY.
CONVEYING BELT.
(Application filed Dec. 7, 1901.)

(No Model.) 2 Sheets—Sheet 1.

Witnesses
Wm P Hammond
J Green

Inventor
John J Ridgway
by Henry &c
Attys.

THE NORRIS PETERS CO., PHOTO-LITHO., WASHINGTON, D. C.

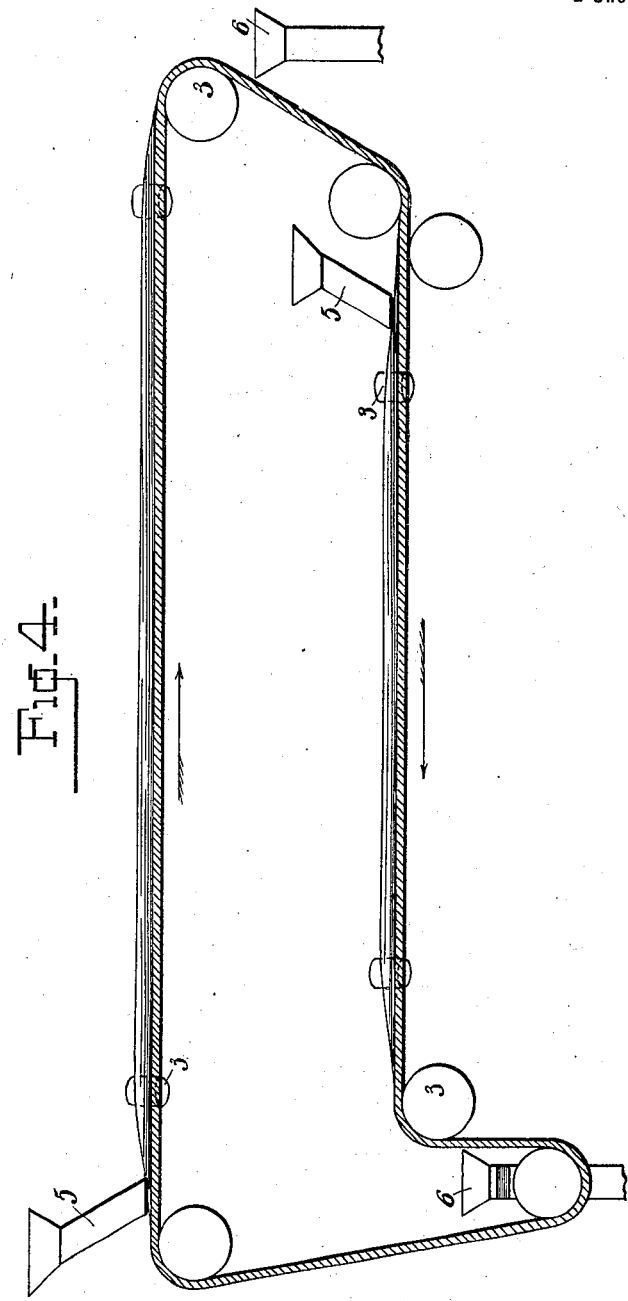

UNITED STATES PATENT OFFICE.

JOHN J. RIDGWAY, OF ROSEBANK, NEW YORK.

CONVEYING-BELT.

SPECIFICATION forming part of Letters Patent No. 707,355, dated August 19, 1902.

Application filed December 7, 1901. Serial No. 85,089. (No model.)

*To all whom it may concern:*

Be it known that I, JOHN J. RIDGWAY, a citizen of the United States, residing at Rosebank, in the borough of Richmond and State of New York, have invented certain new and useful Improvements in Conveying-Belts, of which the following is a specification.

This invention relates to improvements in conveying-belts; and its object is to provide a belt that is more wear resistant than the usual forms of belt and is, moreover, adapted for use on both sides.

Conveying-belts have heretofore been made of rubber with a canvas or other fabric insertion, and to facilitate the bending of the belt to form a trough and for other reasons the rubber has been made thicker at the middle than at the sides, or vice versa. I found that such a belt is liable to wear along the lines of bending to such an extent as to seriously impair its durability. To obviate this defect, I make the rubber cover or outside of the belt thicker along the lines on which the belt is to be bent in its operation. Thus in the case of a belt to form a flat-bottomed moving trough with upwardly-inclined sides the rubber is made thicker along two lines between the center and the edge portions of the belt where the flat bottom meets the upwardly-inclined portions. By making similar thickened portions on both sides of the belt it may be used equally well on both sides. For example, when one side is worn out it may be reversed and the other side used, or a belt may be used in one part to carry in one direction on its upper side and in another part to carry in the opposite direction on the other side. It is desirable to have the belt of even thickness throughout, and therefore when the rubber is thicker the fabric insertion is made correspondingly thinner.

Figure 1:
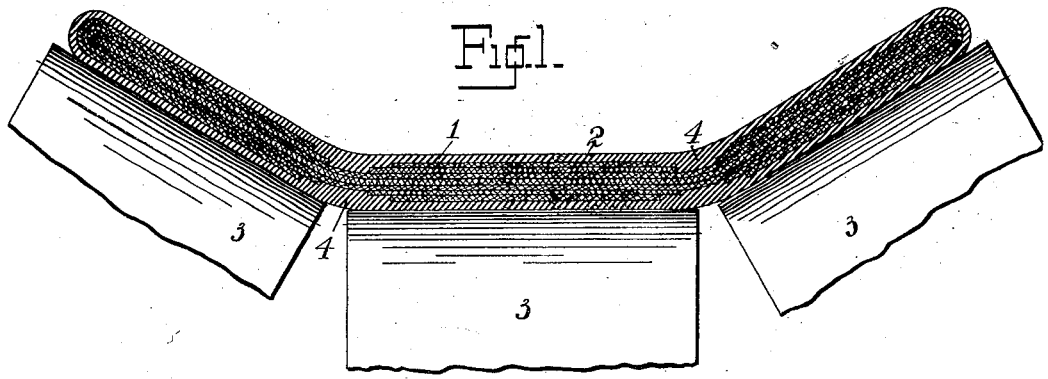
Figure 2:
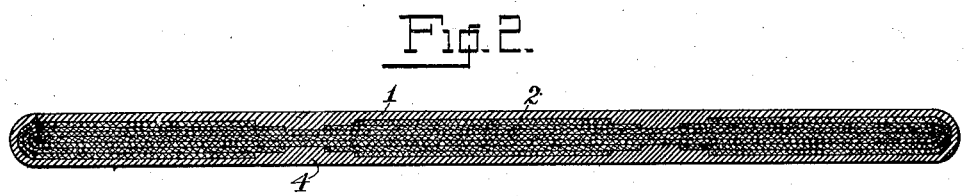
Figure 3:
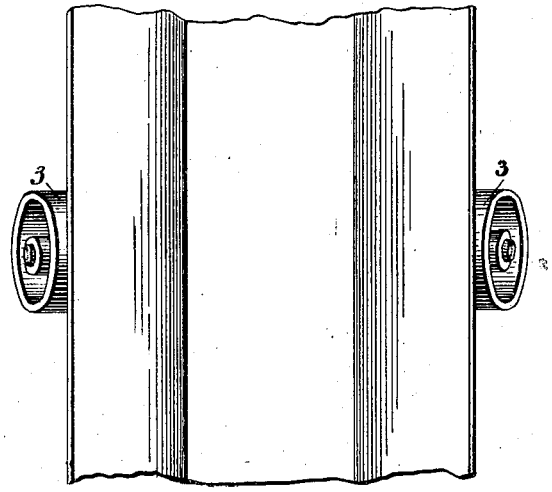

In the accompanying drawings, Figure 1 is a vertical section of a conveyer-belt embodying my invention, showing it in position on the supporting-rolls. Fig. 2 is a vertical section of the belt in flat condition. Fig. 3 is a plan view of the belt, and Fig. 4 represents the application of such a belt to conveying in both directions.

The belt is composed of a casing or cover 1, of soft vulcanized rubber or similar elastic material, and a core or insertion 2, of canvas or other suitable fabric. The belt is supported and runs on rolls, (indicated at 3 in Figs. 1 and 3,) the outer rolls being inclined upwardly, so that as the belt passes over them it is correspondingly bent along lines parallel to its length and forms a trough for the reception of material to be conveyed. Along the lines where this bend takes place between the center and the edge portion of the belt the rubber is made thicker, as indicated at 4, the fabric being there made correspondingly thinner. As a result the belt is more flexible along these lines of flexure and at the same time more wear resistant. The thickening of the belt along the lines aforesaid is preferably applied to both sides of the belt, as shown, whereby the belt is not only made more flexible and durable, but when one side has been worn out it may be reversed and the other side used, or, as shown in Fig. 4, the same belt may in different portions of its length be reversed in flexure and direction of movement, so as to convey in both directions simultaneously, suitable feeding and receiving devices 5 6 being provided to convey the material to and from the belt.

Having thus described my invention, the following is what I claim as new therein and desire to secure by Letters Patent:

1. A conveyer-belt adapted to be bent along lines parallel to its length to form a conveying-trough and consisting of a fabric core and an elastic covering thickened along the lines of flexure between the center and the edge portions of the belt, the center and edge portions of the belt-covering being thinner than such thickened portions.

2. A conveyer-belt adapted to be bent along lines parallel to its length to form a conveying-trough and consisting of a fabric core and a rubber covering thickened on both sides of the belt along the lines of flexure between the center and the edge portions of the belt.

3. A belt having a fabric core and a rubber covering with thickened portions on both sides of the belt along lines parallel to its length between the center and the edge portions of the belt, the fabric core being correspondingly thinner at such portions and the belt being of substantially even thickness throughout.

4. A conveyer-belt having a fabric core, and a rubber cover with thickened portions along lines parallel to its length, on both sides of the belt, and between the center and the edge portions of the belt.

5. A conveyer-belt having a fabric core, and a rubber cover with thickened portions along lines parallel to its length, on both sides of the belt, in combination with means for supporting different portions of said belt so as to bend same reversely and move same in opposite directions.

JOHN J. RIDGWAY.

Witnesses:
J. GREEN,
A. P. KNIGHT.